A. M. KEITH.
Steam-Plow.
No. 25,419.
Patented Sept. 13, 1859.
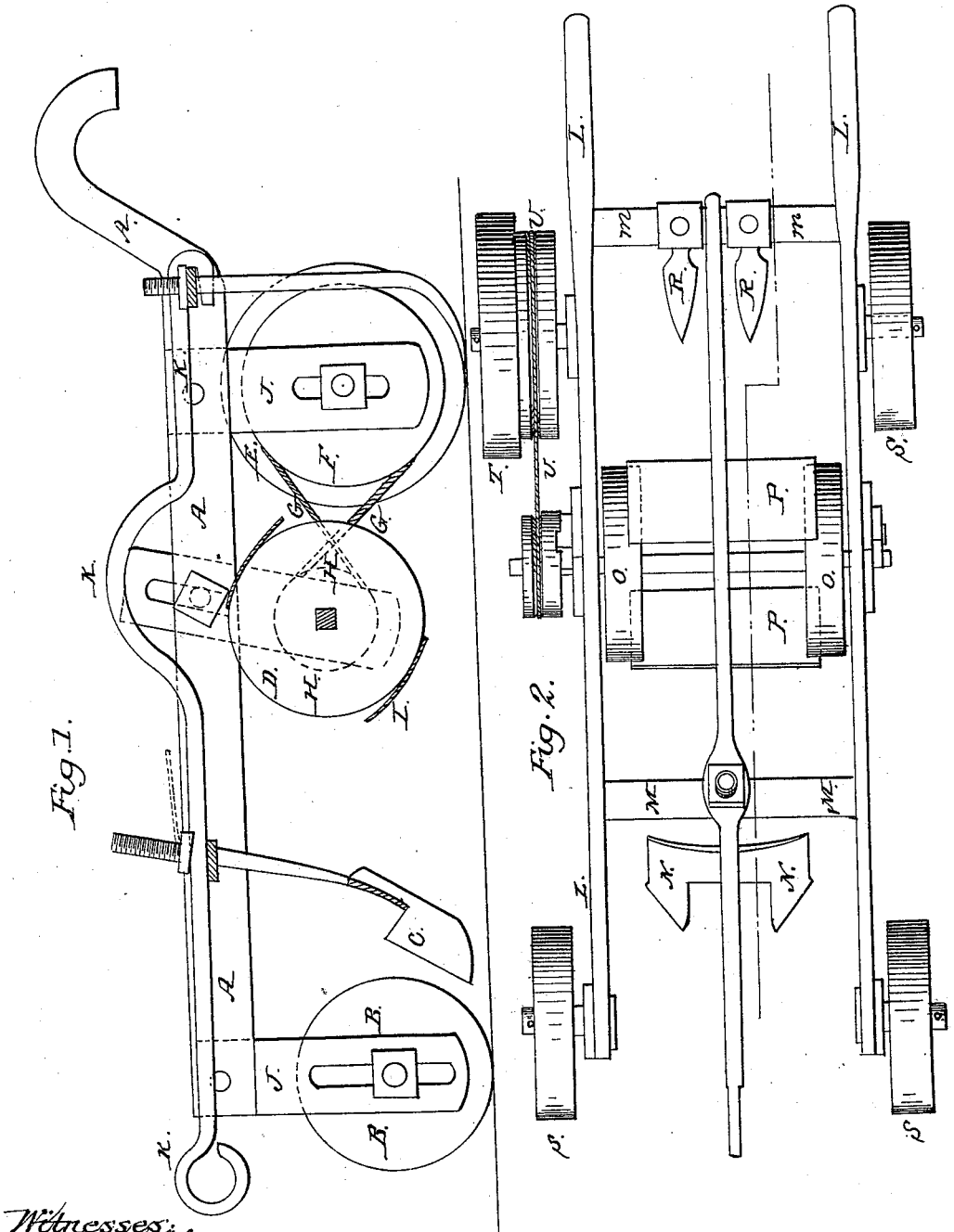

UNITED STATES PATENT OFFICE.

ASA M. KEITH, OF KOSCIUSKO, MISSISSIPPI.

IMPROVEMENT IN CULTIVATORS.

Specification forming part of Letters Patent No. 25,419, dated September 13, 1859.

*To all whom it may concern:*

Be it known that I, ASA M. KEITH, of the town of Kosciusko, in Attala county and State of Mississippi, have invented a new and useful Machine or Implement for Cultivating Cotton and Corn, to be titled "Keith's Labor-Saving Cultivator;" and I do hereby declare that the following is a full, clear, and exact description of the construction and operation of the same, reference being had to the annexed drawings, making a part of this specification, in which—

Figure 1 is a longitudinal side view; Fig. 2, a transverse view.

Letter A represents, in Fig. 1, the side stocks, there being two of them three feet four inches in length and eighteen inches between them; letter B in Fig. 1, the wheels before, on which the cultivator runs; letter C, a side view of a double scraper; letter D, a side view of hoe-drum; letter E, large right-hand wheel; F, a small wheel fixed on inside of large right-hand wheel E, over which passes a band, (marked in No. 1 G,) and over a pulley connected with hoe-drum, which pulley is in Fig. 1 letter H.

The letter I in No. 1 represents two hoes fastened to hoe-drum.

Letter J represents the bars upon which the wheels of cultivator are suspended, which are fastened to stocks A.

Letter K represents the beam by which the cultivator is drawn, which is fastened by screw and tap to the cross-bars connecting side stocks.

In No. 2, letter L represents the side stocks, as represented by letter A in No. 1; letter M, the bars connecting side stocks.

Letter N represents a full view of the double scraper alluded to in No. 1 by letter C, which double scraper is suspended from and fastened to front cross-bar by screw and tap.

Letter O represents the hoe-drum alluded to in No. 1 by letter D; letter P, the hoes.

Letter R represents two hillers, suspended to back cross-bar by screw and tap, one on each side of drawing-beam represented in No. 1 by letter K. Said hillers are so constructed as that one of them throws the dirt to the right and the other to the left.

Letters S represent the two fore wheels and the left-hand hind wheel upon which cultivator runs.

T represents the large right-hand wheel marked E in No. 1; letter U, the small wheel inside of large one E, over which passes band to pulley, causing hoe-drum to revolve.

The cultivator is intended to bar off and scrape both sides of a row, chop out twelve inches and leave four, and to hill and dirt cotton, and to bar off, scrape, and hill or dirt corn all at the same time and by the same movement, thereby doing with one person and one or two horses the work of eleven persons and four horses, the way cotton and corn are now cultivated.

To enable others to make and use my invention, I will say that the whole is constructed out of iron and steel, the stocks, beam, and wheels being of cast-iron, the scraper and hiller of wrought-iron, the hoes of cast-steel. The whole cultivator is put together by screws and taps, so that the scraper, hoes, and hillers can be raised and lowered at pleasure. The cultivator is drawn by single-tree attached to beam, and is so constructed, by reason of large right-hand wheel, that it can be guided and managed by any person capable of using common plow. The band passing over small wheel and pulley to revolve hoe-drum can be made of either india-rubber or leather.

What I claim by my invention, and desire to secure by Letters Patent, is—

The arrangement of the double scraper, the hoe-drum, and the hillers or coverers in their relation to each other and to the parts of the frame to which they are attached, as and for the purposes herein set forth.

ASA M. ×<sup>his</sup> KEITH,
<sub>mark.</sub>

Witnesses:
SAM. YOUNG,
M. A. CLARK.